United States Patent
Suzuki

(10) Patent No.: US 11,314,470 B1
(45) Date of Patent: Apr. 26, 2022

(54) IMAGE FORMING APPARATUS

(71) Applicant: TOSHIBA TEC KABUSHIKI KAISHA, Tokyo (JP)

(72) Inventor: Katsunori Suzuki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/202,799

(22) Filed: Mar. 16, 2021

(51) Int. Cl.
    *G06F 15/00*     (2006.01)
    *G06F 3/12*     (2006.01)
    *G06K 1/00*     (2006.01)

(52) U.S. Cl.
    CPC .......... *G06F 3/1236* (2013.01); *G06F 3/1204* (2013.01); *G06F 3/1292* (2013.01)

(58) Field of Classification Search
    CPC ..... G06F 3/1236; G06F 3/1204; G06F 3/1292
    USPC ............................... 358/1.15, 1.14, 1.13, 1.1
    See application file for complete search history.

(56) References Cited

U.S. PATENT DOCUMENTS

| | | | |
|---|---|---|---|
| 9,888,132 B2 | 2/2018 | Shibao | |
| 2013/0114103 A1* | 5/2013 | Oishi | H04N 1/32771 358/1.15 |
| 2018/0349080 A1* | 12/2018 | Oikawa | G06F 9/5083 |
| 2021/0240422 A1* | 8/2021 | Tanaka | G06F 3/1238 |

FOREIGN PATENT DOCUMENTS

JP      2017-185684      10/2017

\* cited by examiner

*Primary Examiner* — Douglas Q Tran
(74) *Attorney, Agent, or Firm* — Foley & Lardner LLP

(57) ABSTRACT

According to one embodiment, the image forming apparatus includes a communication interface, a communication unit, a first storage unit, an acquisition unit, and a transmission unit. The communication interface is connected to a network to which other image forming apparatuses and a mobile terminal can be connected. The communication unit communicates with a server that processes an image forming job requested by the mobile terminal. The first storage unit stores first device information for specifying the server. The acquisition unit acquires device information transmitted from the other image forming apparatuses to the network. The transmission unit transmits the first device information stored in the first storage unit to the network via the communication interface, when the device information acquired by the acquisition unit does not include the first device information.

20 Claims, 4 Drawing Sheets

FIG. 3
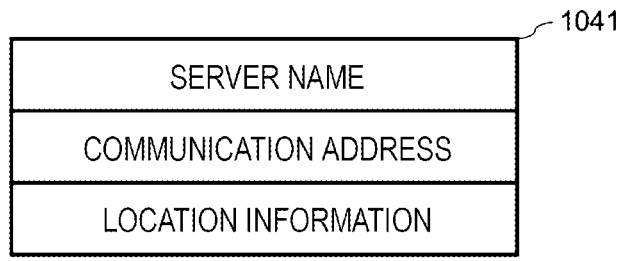
FIG. 4
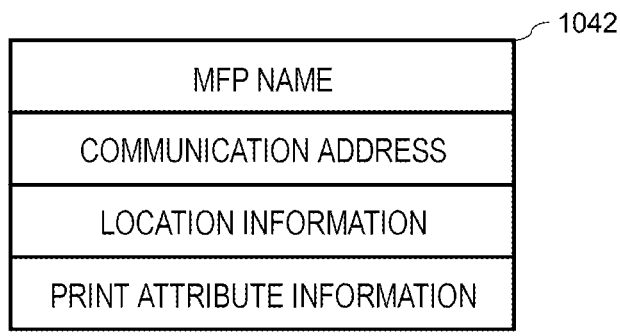
FIG. 5
| ITEM | ARRANGEMENT ORDER | NARROWING-DOWN WORD |
|---|---|---|
| MFP NAME | ON/OFF | ABC |
| COMMUNICATION ADDRESS | ON/OFF | XXX.XXX.XXX-XXX |
| LOCATION INFORMATION | ON/OFF | 2F-1 |

IMAGE FORMING APPARATUS

FIELD

Embodiments described herein relate generally to an image forming apparatus.

BACKGROUND

A mechanism, in which a document and an image are printed by wirelessly transmitting print data from a mobile terminal such as a smartphone to a multifunction peripheral (MFP), is known. For example, a user starts a print-only application installed in the mobile terminal in a facility where a wireless local area network (LAN) environment is provided. Then, a list of identification names and installation locations of MFPs connected to the wireless LAN is displayed on a display of the mobile terminal. The user selects the MFP with which the user wishes to perform printing from the list and commands printing. Next, the print data is wirelessly transmitted from the mobile terminal to the selected MFP, and printing is executed by the MFP.

DESCRIPTION OF THE DRAWINGS

FIG. 3 is a diagram illustrating an example of server information stored in a server information storage unit;

FIG. 4 is a diagram illustrating an example of own device information stored in an own device information storage unit;

FIG. 5 is a diagram illustrating an example of setting information stored in a setting information storage unit.

DETAILED DESCRIPTION

The above-described mechanism has points to be improved. For example, the user selects one MFP with which the user wishes to perform printing from the list of MFPs. Therefore, when the number of MFPs displayed in the list is large, selection is difficult and complicated. When the user who commands the printing goes to a location where the selected MFP is installed and a plurality of MFPs are installed at almost the same location, the user should check which MFP outputs a printed matter one by one. The embodiments described herein address these issues.

In general, according to at least one embodiment, the image forming apparatus includes a communication interface, a communication unit, a first storage unit, an acquisition unit, and a transmission unit.

The communication interface is connected to a network to which other image forming apparatuses and a mobile terminal can be connected. The communication unit communicates with a server that processes an image forming job requested by the mobile terminal. The first storage unit stores first device information for specifying the server. The acquisition unit acquires device information transmitted from the other image forming apparatuses to the network. The transmission unit transmits the first device information stored in the first storage unit to the network via the communication interface, when the device information acquired by the acquisition unit does not include the first device information.

As the above-described image forming apparatus, for example, there are an MFP, a laser printer, an inkjet printer, and the like. Hereinafter, an embodiment in which the MFP is used as an example of the image forming apparatus will be described with reference to the drawings.

Figure 1:
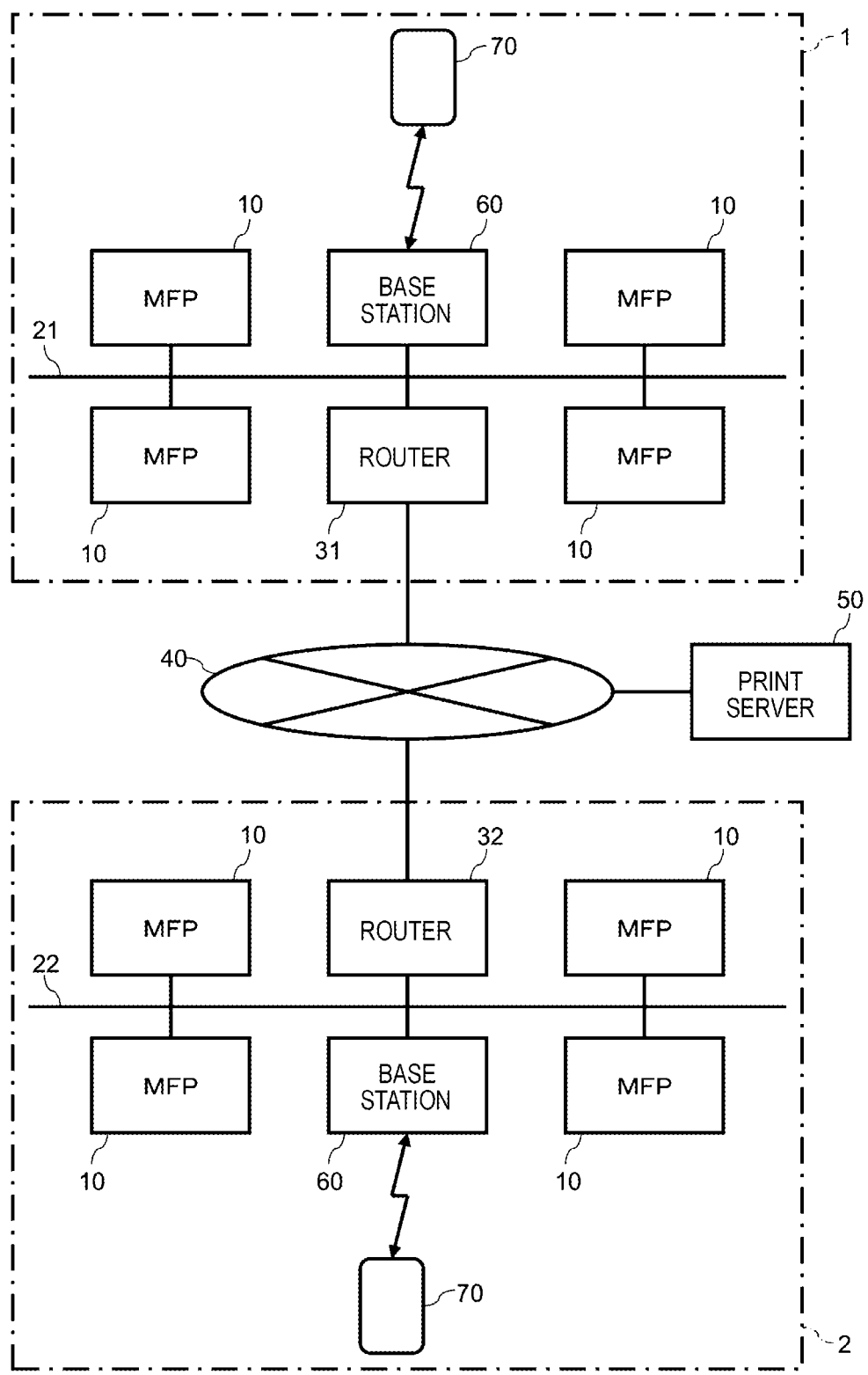
FIG. 1 is a system configuration diagram according to at least one embodiment.

FIG. 1 is a system configuration diagram according to an embodiment. FIG. 1 illustrates a system of a facility provided with a plurality of MFPs 10. The facility is divided into a first area 1 and a second area 2. The area is, for example, a floor of a building. The area may be a room in which one floor is partitioned by a wall. The number of areas is not particularly limited. There may be only one area or three or more areas.

The plurality of MFPs 10 are installed in both the first area 1 and the second area 2. An installation location of the MFP 10 is not particularly limited as long as the installation location thereof is within the same area. The MFPs 10 may be installed separately one by one, or at least two MFPs 10 may be installed adjacent to each other. The number of MFPs 10 is also not particularly limited. The same number of MFPs 10 may be installed in each of the first area 1 and the second area 2, or different numbers of MFPs 10 may be installed therein.

In the first area 1, the plurality of MFPs 10 are connected to each other by a communication network 21. In the second area 2, the plurality of MFPs 10 are connected to each other by a communication network 22. The communication network 21 is connected to a router 31. The communication network 22 is connected to a router 32. Each of the routers 31 and 32 is connected to a communication network 40, respectively. That is, the router 31 relays data transmitted and received between the communication network 40 and the communication network 21. The router 32 relays data transmitted and received between the communication network 40 and the communication network 22.

The communication network 40 is connected to a print server 50. The print server 50 is a server executing a service that processes an image forming job given from the outside and provides print data to the MFP 10. The print data is outputted to the MFP 10 set as an output destination through the communication network 40. The MFP 10 acquiring the print data via the communication network 21 or the communication network 22 prints a document and an image based upon the print data.

The communication network 21, the communication network 22, and the communication network 40 are computer networks that transmit and receive data by using, for example, a transmission control protocol (TCP) and an Internet protocol (IP) as a communication protocol. The communication network 40 forms a backbone network. The communication network 21 and the communication network 22 form a sub-network.

A wireless base station 60 is installed in both the first area 1 and the second area 2. The wireless base station 60 is an access point for wirelessly transmitting and receiving data to and from a mobile terminal 70 corresponding to the wireless LAN. By installing the wireless base station 60 in the first area 1 and the second area 2, the first area 1 and the second area 2 become areas in which an environment of the wireless LAN is provided. The number of wireless base stations 60 is not limited to one. When one unit does not provide the environment of the wireless LAN in the whole area, two or more wireless base stations 60 may be installed in the same area. In the first area 1, the wireless base station 60 is connected to the communication network 21. By the connection therebetween, the mobile terminal 70 can transmit and receive data to and from the MFP 10 installed in the first area 1 via the wireless LAN. The mobile terminal 70 can also transmit and receive data to and from the print server 50 via the wireless LAN. By the above-described communication environment, the mobile terminal 70 located in the first area 1 can request the MFP 10 installed in the first area 1 to perform the image forming job for printing the document and the image. The mobile terminal 70 can also request the print server 50 to perform a similar image forming job.

In the second area 2, the wireless base station 60 is connected to the communication network 22. By the connection therebetween, the mobile terminal 70 can transmit and receive data to and from the MFP 10 installed in the second area 2 via the wireless LAN. The mobile terminal 70 can also transmit and receive data to and from the print server 50 via the wireless LAN. By the above-described communication environment, the mobile terminal 70 located in the second area 2 can request the MFP 10 installed in the second area 2 to perform the image forming job for printing the document and the image. The mobile terminal 70 can also request the print server 50 to perform a similar image forming job.

The mobile terminal 70 is typically a smartphone. The mobile terminal 70 may be a tablet terminal, a mobile phone, a laptop computer, and a portable game device.

Figure 2:
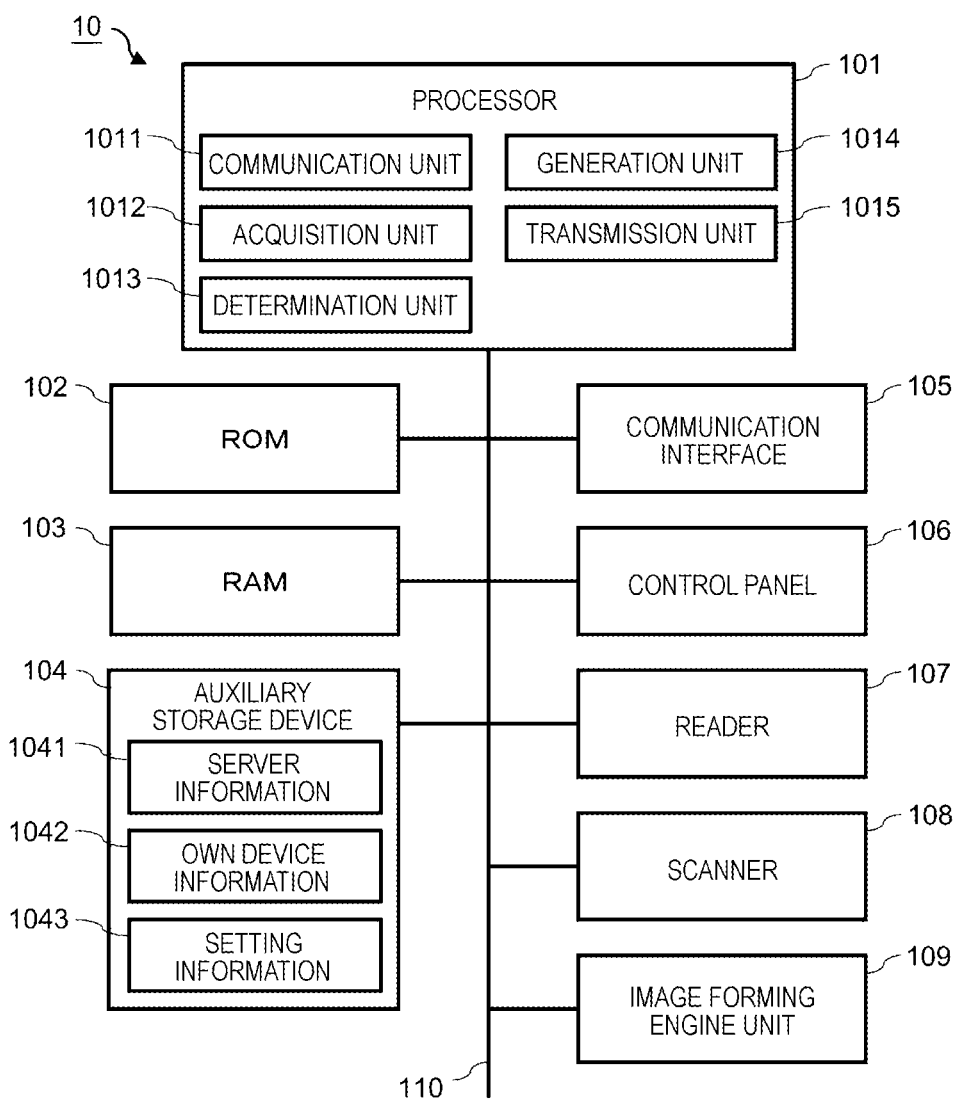
FIG. 2 is a block diagram illustrating a circuit configuration of a main unit of an MFP.

FIG. 2 is a block diagram illustrating a main circuit configuration of any one MFP 10 (a target image forming apparatus). Since circuit configurations of other MFPs 10 are also the same, the description thereof will be omitted.

The MFP 10 includes a processor 101, a read only memory (ROM) 102, a random access memory (RAM) 103, an auxiliary storage device 104, a communication interface 105 (first communicator), a control panel 106, a reader 107, a scanner 108, an image forming engine unit 109, and a system bus 110. The system bus 110 includes an address bus and a data bus. The MFP 10 forms a main circuit as an MFP by connecting the processor 101, the ROM 102, the RAM 103, the auxiliary storage device 104, the communication interface 105, the control panel 106, the reader 107, the scanner 108, and the image forming engine unit 109 by the system bus 110, respectively.

The processor 101 controls each unit in order to realize various functions as the MFP 10 according to an operating system or an application program. The processor 101 is, for example, a central processing unit (CPU).

The ROM 102 and the RAM 103 function as a main memory of the processor 101. The ROM 102 is a non-volatile memory area. The ROM 102 stores the operating system or the application program. The ROM 102 may store data necessary for the processor 101 to execute processing for controlling each unit. The RAM 103 is a volatile memory area. The RAM 103 is used as a work area in which data is appropriately rewritten by the processor 101.

The auxiliary storage device 104 functions as an auxiliary storage device of the processor 101. As the auxiliary storage device 104, for example, a well-known storage device such as an electric erasable programmable read-only memory (EEPROM), a hard disc drive (HDD), or a solid state drive (SSD) is used by itself or in combination of a plurality thereof. The auxiliary storage device 104 stores data to be used by the processor 101 to perform various kinds of processing and data generated by the processing of the processor 101. The auxiliary storage device 104 may store the application program.

The communication interface 105 is connected to a communication network. Specifically, the communication interface 105 of the MFP 10 installed in the first area 1 is connected to the communication network 21. The communication interface 105 of the MFP 10 installed in the second area 2 is connected to the communication network 22. That is, the communication interface 105 is connected to the communication network 21 or the communication network 22 to which other MFPs 10 (auxiliary image forming apparatuses) and the mobile terminal 70 can be connected.

The control panel 106 includes a display device and an input device. The display device is a liquid crystal display and an organic electro luminescence (EL) display. The display device displays various types of information about the MFP 10. The input device is a device in which a plurality of keys or buttons are arranged. The input device receives an input of a user and outputs a signal corresponding to the input. The input device may be a touch panel integrated with the display device.

The reader 107 is a device for reading data recorded on a recording medium. When the recording medium is an informed consent (IC) card, the reader 107 is an IC card reader capable of reading memory data of the IC card. The IC card reader may be a contact type, and may be a non-contact type. When the recording medium is a medium for displaying a code such as a bar code and a two-dimensional data code, the reader 107 is a code reader. The MFP 10 may include any one type of the reader 107, or may include two or more types of the reader 107.

The scanner 108 is an apparatus that reads an image of an original document placed on a glass surface of an original document platen and converts the image thereof into image data. The scanner 108 is used for a copy function and a facsimile function of the MFP 10. The image forming engine unit 109 includes a charging unit, an exposure unit, a developing unit, a transfer unit, and a fixing unit. The charging unit charges a surface of a photoreceptor. The exposure unit exposes the surface of the charged photoreceptor to form a latent image. The developing unit develops the latent image formed on the surface of the photoreceptor with toner. The transfer unit transfers a toner image developed on the surface of the photoreceptor to a print medium. The fixing unit fixes the toner image transferred to the print medium to the print medium.

The MFP 10 having such a configuration uses a part of a storage area of the auxiliary storage device 104 as a server information storage unit 1041, an own device information storage unit 1042, and a setting information storage unit 1043. The server information storage unit 1041 stores server information. The own device information storage unit 1042 stores own device information. The setting information storage unit 1043 stores setting information.

FIG. 3 is a diagram illustrating an example of the server information. As illustrated in the drawing, the server information includes a server name, a communication address, and a location information. The server name is a device name set for the print server 50. The communication address is an IP address set for the print server 50. The location information is information indicating an installation location of the print server 50. That is, the server information is device information of the print server 50. The server information is not limited to the server name, the communication address, and the location information. The server information may include information on other items related to the print server 50.

The server information storage unit 1041 that stores such server information functions as a first storage unit (first memory) that stores first device information for specifying the print server 50. FIG. 4 is a diagram illustrating an example of the own device information. As illustrated in the drawing, the own device information includes an MFP name, a communication address, location information, and a print attribute information of the own device. The MFP name is a device name set for the MFP 10. The communication address is an IP address set for the MFP 10. The location information is information indicating an installation location of the MFP 10. The print attribute information is attribute information related to printing of the MFP 10. The attribute information includes information such as a print method, a paper size, a finisher, and a print speed. That is, the own device information is the device information of the MFP 10. The own device information is not limited to the MFP name, the communication address, the location information, and the print attribute information. The own device information may include information on other items related to the print server 50. For example, compliance adaptation information, security authentication information, environment adaptation information, or mobile application information of the MFP 10 may be included as the own device information.

The own device information storage unit 1042 that stores such own device information functions as a second storage unit (second memory) that stores second device information for specifying the own device. FIG. 5 is a diagram illustrating an example of the setting information. As illustrated in the drawing, the setting information includes an arrangement order flag and a narrowing-down word set (filtering word set) for each of the MFP name, the communication address, and the location information in the own device information. The arrangement order flag and the narrowing-down word (filtering word) are information related to a transmission condition of the own device information.

The arrangement order flag is one bit data for identifying whether to execute arrangement order processing with an item of corresponding own device information. When the arrangement order flag corresponding to any one item is turned ON, all the arrangement order flags corresponding to other items are turned OFF. For example, when the arrangement order flag for the MFP name is ON, the MFP names of the respective MFPs 10 are arranged in alphabetical order by the arrangement order processing. The arrangement order processing for the communication address and the location information is the same as the above.

The narrowing-down word is a word for performing narrowing-down (filtering) processing on the corresponding item of the own device information. For example, when the narrowing-down word for the MFP name is "ABC," the MFP 10 including "ABC" as the MFP name is narrowed down by the narrowing-down processing. The narrowing-down processing for the communication address and the location information is the same as the above.

The setting information storage unit 1043 that stores such setting information functions as a third storage unit (third memory) that stores the transmission condition of the device information.

The items for which the setting information is set are not limited to the MFP name, the communication address, and the location information. For example, the arrangement order and the narrowing-down word may be set for the print attribute information such as the print method, the paper size, the finisher, the print speed, and an automatic original document feeder. The arrangement order and the narrowing-down word may be set for the compliance adaptation information, the security authentication information, the environment adaptation information, or the mobile application information of the MFP 10.

Referring back to the description of FIG. 2, the processor 101 has functions as a communication unit 1011 (second communicator), an acquisition unit 1012 (acquirer), a determination unit 1013 (determiner), a generation unit 1014 (generator), and a transmission unit 1015 (transmitter).

The communication unit 1011 is a function for communicating (facilitates communication) with the print server 50. The communication unit 1011 realizes the function in cooperation with the communication interface 105.

The acquisition unit 1012 is a function for acquiring (facilitates acquiring) the device information transmitted from other MFPs 10 to the communication network 21 or the communication network 22. The device information is the server information stored in the server information storage unit 1041 or the own device information stored in the own device information storage unit 1042. The acquisition unit 1012 realizes the function in cooperation with the communication interface 105.

The determination unit 1013 is a function for determining (facilitates determining) whether the server information is stored in the server information storage unit 1041. The MFP 10 does not necessarily store the server information of the print server 50 in the server information storage unit 1041. For example, the MFP 10 that does not receive the print service by the print server 50 does not store the server information in the server information storage unit 1041. The determination unit 1013 realizes the function in cooperation with the auxiliary storage device 104. The server information may be stored in the ROM 102 or the RAM 103. Here, the determination unit 1013 realizes the function in cooperation with the ROM 102 or the RAM 103.

The generation unit 1014 is a function for generating (facilitates generating) a list of device information that satisfies the transmission condition stored in the setting information storage unit 1043 from the device information acquired by the acquisition unit 1012 and the own device information stored in the own device information storage unit 1042. The list is, for example, a list of all or a part of the server name, the communication address, and the location information in the own device information of the plurality of MFPs 10. The generation unit 1014 realizes the function in cooperation with the auxiliary storage device 104. The own device information may be stored in the ROM 102 or the RAM 103. Here, the generation unit 1014 realizes the function in cooperation with the ROM 102 or the RAM 103.

The transmission unit 1015 is a function for transmitting (facilitates transmitting) the server information stored in the server information storage unit 1041 or the own device information stored in the own device information storage unit 1042 to the communication network 21 or the communication network 22. The transmission unit 1015 realizes the function in cooperation with the communication interface 105.

Specifically, when the device information acquired by the acquisition unit 1012 does not include the server information, the transmission unit 1015 transmits the server information stored in the server information storage unit 1041 to the communication network 21 or the communication network 22. When the device information acquired by the acquisition unit 1012 includes the server information, the transmission unit 1015 does not transmit the server information stored in the server information storage unit 1041 to the communication network 21 or the communication network 22.

When the determination unit 1013 determines that the server information is not stored, and when the device information acquired by the acquisition unit 1012 does not include the own device information, the transmission unit 1015 transmits the own device information stored in the own device information storage unit 1042 to the communication network 21 or the communication network 22. When the determination unit 1013 determines that the server information is not stored, and when the device information acquired by the acquisition unit 1012 includes the own device information, the transmission unit 1015 does not transmit the own device information stored in the own device information storage unit 1042 to the communication network 21 or the communication network 22. When the list generated by the generation unit 1014 includes the server name, the communication address, or the location information of the own device, the transmission unit 1015 transmits the own device information stored in the own device information storage unit 1042 to the communication network 21 or the communication network 22. When the list generated by the generation unit 1014 does not include the server name, the communication address, or the location information of the own device, the transmission unit 1015 does not transmit the own device information stored in the own device information storage unit 1042 to the communication network 21 or the communication network 22.

Figure 6:
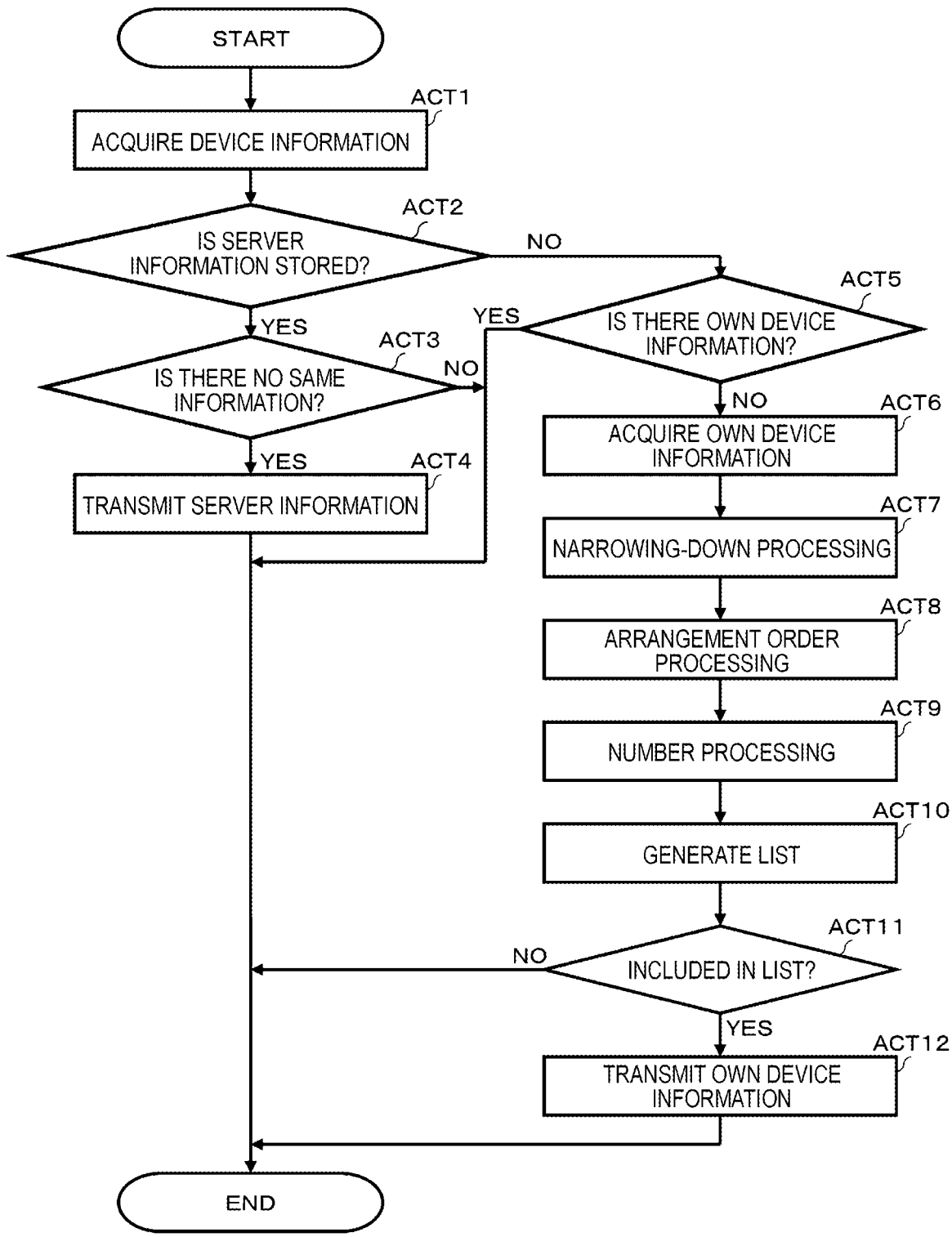
FIG. 6 is a flowchart illustrating a procedure of main information processing executed by a processor of the MFP.

FIG. 6 is a flowchart illustrating a procedure of main information processing executed by the processor 101 of any one MFP 10 installed in the first area 1 according to a control program. Since procedures of main information processing executed by the processors 101 of other MFPs 10 installed in the first area 1 and the processors 101 of other MFPs 10 installed in the second area 2 are the same as the above, the description thereof will be omitted.

The control program is stored in the ROM 102. Alternatively, the control program is installed in the auxiliary storage device 104. A method for installing the control program in the auxiliary storage device 104 is not particularly limited. The control program can be installed in the auxiliary storage device 104 by recording the control program in a removable recording medium, or by distributing the control program by communication via a network. The recording medium may be in any form as long as the recording medium can store a program like a CD-ROM and a memory card, and the apparatus can read the recording medium.

As ACT1, the processor 101 acquires device information flowing through the communication network 21 by the action of the acquisition unit 1012. The device information is information transmitted to the communication network 21 by the action of the transmission unit 1015 provided in each MFP 10 connected to the communication network 21. The device information is the server information stored in the server information storage unit 1041 or the own device information stored in the own device information storage unit 1042.

The device information is transmitted from each MFP 10, for example, in a form of an advertisement packet. Here, the processor 101 scans the advertisement packet on the communication network 21 via the communication interface 105. Each time the advertisement packet is received by the scan, the processor 101 acquires the device information from the advertisement packet. The processor 101 temporarily stores the acquired device information in the work area of the RAM 103.

When completing the acquisition of the device information flowing through the communication network 21, the processor 101 determines whether the server information is stored in the server information storage unit 1041 by the action of the determination unit 1013 as ACT2. When the server information is stored therein, the processor 101 proceeds from ACT2 to ACT3.

As ACT3, the processor 101 confirms whether the same device information as the server information stored in the server information storage unit 1041 exists in (is contained within) the device information acquired via the communication network 21. When the same device information as the server information does not exist therein, the processor 101 determines YES in ACT3 and proceeds to ACT4. As ACT4, the processor 101 transmits the server information stored in the server information storage unit 1041 to the communication network 21 via the communication interface 105 by the action of the transmission unit 1015.

On the other hand, when the same device information as the server information exists therein, the processor 101 determines NO in ACT3. The processor 101 does not transmit the server information stored in the server information storage unit 1041 to the communication network 21. After that, the processor 101 ends the procedure when the server information is stored in the server information storage unit 1041.

In ACT2, when the server information is not stored in the server information storage unit 1041, the processor 101 proceeds from ACT2 to ACT5. As ACT5, the processor 101 confirms whether the same device information as the own device information stored in the own device information storage unit 1042 exists in the device information acquired via the communication network 21.

When the same device information as the own device information does not exist therein, the processor 101 determines NO in ACT5 and proceeds to ACT6. As ACT6, the processor 101 acquires own device information from the device information stored in the work area. The own device information is own device information of other MFPs 10 connected to the communication network 21. The processor 101 also acquires the own device information stored in the own device information storage unit 1042. Next, the processor 101 executes the narrowing-down processing for all the own device information acquired as ACT7.

Specifically, the processor 101 acquires a narrowing-down word of the MFP name from the setting information of the setting information storage unit 1043. Next, the processor 101 extracts the own device information including the narrowing-down word as a part of the MFP name. Next, the processor 101 acquires a narrowing-down word of the communication address from the setting information of the setting information storage unit 1043. Next, the processor 101 extracts the own device information including the narrowing-down word as a part of the communication address from the own device information narrowed down by the MFP name. Next, the processor 101 acquires a narrowing-down word of the location information from the setting information of the setting information storage unit 1043. Next, the processor 101 extracts the own device information including the narrowing-down word as a part of the location information from the own device information narrowed down by the MFP name and the communication address. By the above-described narrowing-down processing, the own device information acquired by the processing of ACT6 is narrowed down to only the own device information including the narrowing-down word which is a transmission condition.

When the narrowing-down processing is completed, the processor 101 executes the arrangement order processing as ACT8. Specifically, the processor 101 searches the setting information storage unit 1043 and acquires an item in which an arrangement order flag is in an ON state. For example, when the item is the "MFP name," the processor 101 arranges the own device information narrowed down by the narrowing-down processing so that the "MFP name" is in a predetermined order, such as an alphabetical order. The same also applies to other items such as the "communication address" or the "location information." That is, when the item in which the arrangement order flag is in the ON state is the "communication address," the processor 101 arranges the own device information so that the "communication address" is in a predetermined order. When the item in which the arrangement order flag is in the ON state is the "location information," the processor 101 arranges the own device information so that the "location information" is in a predetermined order.

The processor 101 executes number processing as ACT10. The number processing is processing of leaving the own device information of the number of settings in the arrangement order, with respect to the own device information arranged by the arrangement order processing. For example, when the number of settings is "3," the processor 101 leaves the own device information whose arrangement order is a first place, the own device information whose arrangement order is a second place, and the own device information whose arrangement order is a third place. The processor 101 discards the own device information whose arrangement order is a fourth place or lower.

As ACT10, the processor 101 generates a list of the own device information by the action of the generation unit 1014. Specifically, the processor 101 generates a list listing the MFP name, the communication address, and the location information of the own device information remaining after the number processing.

The processor 101 confirms whether the same own device information as the own device information stored in the own device information storage unit 1042 exists in the list as ACT11. When the same own device information exists therein, the processor 101 proceeds from ACT11 to ACT12. As ACT12, the processor 101 transmits the own device information stored in the own device information storage unit 1042 to the communication network 21 via the communication interface 105 by the action of the transmission unit 1015.

On the other hand, when the same information does not exist therein, the processor 101 determines NO in ACT11. The processor 101 does not transmit the own device information stored in the own device information storage unit 1042 to the communication network 21. As described above, when the server information storage unit 1041 does not store the server information, the processor 101 ends the procedure when the same device information as the own device information stored in the own device information storage unit 1042 does not exist in the device information acquired via the communication network 21.

When the same device information as the own device information stored in the own device information storage unit 1042 exists in the device information acquired via the communication network 21 in ACT5, the processor 101 ends the procedure without executing the processing after ACT6.

The processor 101 of each MFP 10 connected to the communication network 21 executes the information processing of the procedure illustrated in the flowchart of FIG. 6. By performing the information processing, the following device information flows through the communication network 21. That is, when each MFP 10 stores the server information in the server information storage unit 1041, any one of the MFPs 10 transmits the server information as the device information to the communication network 21. Other MFPs 10 do not transmit the device information.

Here, a user who wants to print a document and an image by wirelessly transmitting the print data from the mobile terminal 70 to the MFP 10 starts a print-only application installed in the mobile terminal 70 in the first area 1. Next, the device information flowing through the communication network 21 is displayed on the display of the mobile terminal 70. That is, the server information of the print server 50 is displayed thereon.

The user designates the server information and commands printing. Then, an image forming job including the print data is wirelessly transmitted from the mobile terminal 70. The image formation job is received by the wireless base station 60 in the first area 1, is relayed from the communication network 21 to the router 31, and is transmitted to the communication network 40. Next, the image forming job is received by the print server 50. The print server 50 processes the image forming job. The image forming job includes an ID unique to the user set in the mobile terminal 70.

The user who commands the printing goes to a location where any MFP 10 is installed in the first area 1. Next, the user causes the reader 107 of the MFP 10 to read their own ID. Next, the MFP 10 makes an inquiry to the print server 50 via the communication network 21 and the communication network 40. In response to the inquiry, the print server 50 transmits the print data, in which the image forming job including the ID is processed, to the MFP 10 which is an inquiry source. The MFP 10 receiving the print data operates the image forming engine unit 109 to form the image. As such, the document and the image corresponding to the print data are printed by the MFP 10.

As such, by wirelessly transmitting the print data from the mobile terminal 70, the user can print the document and the image based upon the print data from the nearby MFP 10. Here, the user may be only required to designate the server information displayed on the display of the mobile terminal 70 and to command the printing. Therefore, since the user is not required to select the MFP from the list, the user does not feel complicated. When the MFP 10 is located in the first area 1, a printed matter can be acquired from any MFP 10. Therefore, the user is not required to find the selected MFP, thereby improving user-friendliness.

All the MFPs 10 are not limited to necessarily storing the server information in the server information storage unit 1041. There may be a case in which the MFP 10 that stores the server information in the server information storage unit 1041 and the MFP 10 that does not store the server information are mixed. Here, the following device information flows through the communication network 21. That is, the server information is transmitted to the communication network 21 as the device information from the MFP 10 that stores the server information in the server information storage unit 1041. From the MFP 10 that does not store the server information in the server information storage unit 1041, the own device information is transmitted to the communication network 21 as the device information. However, the MFP 10 that transmits the own device information is limited to the MFP 10 satisfying a transmission condition in which the own device information is stored in the setting information storage unit 1043. Even though the transmission condition is satisfied, the own device information is not transmitted from the MFP 10 whose ranking of the own device information is lower than the number of settings of the number processing.

Therefore, the server information of the print server 50 is displayed on the mobile terminal 70 of the user who starts the print-only application in the first area 1. The list of MFPs 10 satisfying the transmission condition is also displayed within a range of the number of settings.

Here, the user designates the server information and commands the printing. Next, the user goes to a location where any MFP 10 is installed in the first area 1, and causes the reader 107 of the MFP 10 to read their own ID. By performing the above-described operation, the user can receive the printed matter of the mobile terminal 70. Even here, since the user is not required to select the MFP, the user does not feel complicated. The user is also not required to find the selected MFP, thereby improving the user-friendliness.

The user can also select the MFP 10 from the list and command the printing. Here, the number of MFPs displayed in the list is within the range of the number of settings. Therefore, in comparison with a related-art method in which all the MFPs are displayed in the list, it is easier to select the MFP such that the use does not feel complicated. For example, by setting the transmission condition such as the MFP name, the communication address, and the location information so that the MFP installed in a limited location satisfies the transmission condition, the user can easily find the selected MFP. Accordingly, the user-friendliness is improved.

There may be a case in which the MFP 10 that stores the server information in the server information storage unit 1041 does not exist. Here, in the communication network 21, the own device information of each MFP 10 is transmitted to the communication network 21 as the device information. However, the MFP 10 that transmits the own device information is limited to the MFP 10 whose own device information satisfies the transmission condition stored in the setting information storage unit 1043. Even though the transmission condition is satisfied, the own device information is not transmitted from the MFP 10 whose ranking of the own device information is lower than the number of settings of the number processing.

Therefore, the number of MFPs displayed as a list on the mobile terminal 70 of the user is within the range of the number of settings. Therefore, in comparison with the related-art method in which all the MFPs are displayed in the list, it is easier to select the MFP such that the user does not feel complicated. For example, by setting the transmission condition such as the MFP name, the communication address, and the location information so that the MFP installed in a limited location satisfies the transmission condition, the user can easily find the selected MFP. Accordingly, the user-friendliness is improved.

While one embodiment in which the MFP is used as an example of the image forming apparatus is described above, the embodiment is not limited thereto. For example, the above-description can be also applied to an image forming apparatus such as a laser printer or an inkjet printer in the same manner as that of the embodiment.

The embodiment illustrates a system including the print server 50 separately from the MFP 10. As another embodiment, one of the plurality of MFPs 10 is configured to have a function as a print server. Accordingly, the print server 50 can be excluded from the system.

In the embodiment, the narrowing-down processing, the arrangement order processing, and the number processing are executed for the own device information acquired by the processing of ACT6. Accordingly, when the MFP 10 is narrowed down to a certain number thereof by the narrowing-down processing, the number processing may be omitted. Alternatively, the arrangement order processing and the number processing can be omitted.

While certain embodiments have been described, these embodiments have been presented by way of example only, and are not intended to limit the scope of present disclosure. Indeed, the novel apparatus and methods described herein may be embodied in a variety of other forms; furthermore, various omissions, substitutions and changes in the form of the apparatus and methods described herein may be made without departing from the spirit of the present disclosure. The accompanying claims and their equivalents are intended to cover such forms or modifications as would fall within the scope and spirit of the present disclosure.

What is claimed is:

1. An image forming apparatus comprising:
   a communication interface connected to a network to which at least one auxiliary image forming apparatus and a mobile terminal are configured to be connected;
   a first memory configured to store a first device information for specifying a server;
   a processor configured to
      communicate with the server, the server being configured to process an image forming job requested by the mobile terminal;
   acquire device information transmitted from the at least one auxiliary image forming apparatus to the network; and
   transmit the first device information to the network via the communication interface when the device information acquired by the processor does not include the first device information.

2. The image forming apparatus of claim 1, wherein the processor is configured to not transmit the first device information to the network when the device information acquired by the processor includes the first device information.

3. The image forming apparatus of claim 1, further comprising:
   a second memory configured to store a second device information for specifying an own device,
   wherein the processor is configured to determine whether the first device information is stored in the first memory, and
   wherein the processor is configured to transmit the second device information to the network, in response to determining that the first device information is not stored, and the device information acquired by the processor does not include the second device information.

4. The image forming apparatus of claim 3, further comprising:
   a third memory configured to store a transmission condition of the device information,
   wherein the processor is configured to generate a list that satisfies the transmission condition, the list generated from the second device information and the device information acquired by the processor; and
   wherein the processor transmits the second device information to the network when the list includes the second device information.

5. The image forming apparatus of claim 4, wherein the transmission condition is at least one of information indicating an installation location of each of the at least one auxiliary image forming apparatus, a communication address of the network set for each of the at least one auxiliary image forming apparatus, and a device name set for each of the at least one auxiliary image forming apparatus.

6. The image forming apparatus of claim 5, wherein the transmission condition includes a number of device information in the list.

7. The image forming apparatus of claim 6, wherein the transmission condition includes an arrangement order of device information in the list.

8. An image forming apparatus comprising:
   a communication interface configured to be connected via a network to one or more auxiliary image forming apparatus and a mobile terminal;
   a processor configured to communicate with a server that processes an image forming job requested by the mobile terminal;
   a first memory configured to store a first device information for specifying an own device;
   a second memory configured to store a transmission condition of the first device information,
   the processor being configured to
   acquire a second device information transmitted from at least one of the one or more auxiliary image forming apparatus to the network;
   generate a list of device information that satisfies the transmission condition stored, the list generated from the first device information and the second device information; and
   transmit the first device information to the network when the list includes the first device information.

9. The image forming apparatus of claim 8, wherein the transmission condition is at least one of: information indicating an installation location of each at of the one or more auxiliary image forming apparatus, a communication address of the network set for each of the one or more auxiliary image forming apparatus, and a device name set for each of the one or more auxiliary image forming apparatus.

10. The image forming apparatus of claim 9, wherein the transmission condition includes a number of the device information in the list.

11. An image forming system comprising:
    a mobile terminal;
    an auxiliary image forming apparatus;
    a network configured to be connected to the mobile terminal and the auxiliary image forming apparatus;
    a server configured to receive an image forming job from the mobile terminal and to process the image forming job; and
    a target image forming apparatus comprising:
      a first memory configured to store a server information associated with the server;
      a processor configured to acquire device information transmitted from the auxiliary image forming apparatus to the network, and to transmit the server information to the network via a communication interface when the device information does not include the server information.

12. The image forming system of claim 11, wherein the processor is configured to not transmit the server information to the network when the device information includes the server information.

13. The image forming system of claim 11, further comprising:
    a second memory configured to store second device information for specifying an own device, wherein the processor is configured to determine whether the server information is stored in the first memory.

14. The image forming system of claim 13, wherein the processor is configured to transmit the second device information stored in the second memory to the network via the communication interface, when the processor determines that the server information is not stored, and the device information acquired by the processor does not include the second device information.

15. The image forming system of claim 14, further comprising a third memory configured to store a transmission condition of the device information acquired by the processor.

16. The image forming system of claim 15, wherein the processor is configured to generate a list that satisfies the transmission condition, the list generated from the acquired device information and the second device information.

17. The image forming system of claim 16, wherein the processor is configured to transmit the second device information to the network when the list includes the second device information.

18. The image forming system of claim 17, wherein the transmission condition is at least one of: information indicating an auxiliary installation location of the auxiliary image forming apparatus, information indicating a target installation location of the target image forming apparatus, a first communication address of the network set for the auxiliary image forming apparatus, a second communication address of the network set for the target image forming apparatus, a first device name set for the auxiliary image forming apparatus, or a second device name set for the target image forming apparatus.

19. The image forming system of claim 18, wherein the transmission condition includes a number of device information in the list, the number associated with the auxiliary image forming apparatus and the target image forming apparatus.

20. The image forming system of claim 19, wherein the transmission condition includes an arrangement order of the device information and the second device information.

* * * * *